United States Patent
Savant

(10) Patent No.: US 9,311,317 B1
(45) Date of Patent: Apr. 12, 2016

(54) INJECTING CUSTOM DATA INTO FILES IN ZIP FORMAT CONTAINING APPS, WITHOUT UNZIPPING, RESIGNING OR RE-ZIPPING THE FILES

(75) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 635 days.

(21) Appl. No.: 13/470,815

(22) Filed: May 14, 2012

(51) Int. Cl.
*G06F 9/445* (2006.01)
*G06F 17/30* (2006.01)
*G06F 9/44* (2006.01)

(52) U.S. Cl.
CPC .......... *G06F 17/30091* (2013.01); *G06F 8/61* (2013.01); *G06F 8/71* (2013.01); *G06F 9/445* (2013.01); *G06F 17/30386* (2013.01)

(58) Field of Classification Search
CPC .............. G06F 17/00; G06F 17/30386; G06F 17/30091; G06F 8/61; G06F 8/71; G06F 9/445
USPC ................................. 770/693, 803
See application file for complete search history.

(56) References Cited

U.S. PATENT DOCUMENTS

| | | | | |
|---|---|---|---|---|
| 7,275,243 | B2* | 9/2007 | Gibbons et al. | 717/159 |
| 8,667,483 | B2* | 3/2014 | Coussemaeker et al. | 717/174 |
| 8,732,145 | B1* | 5/2014 | Lewitt | 707/705 |
| 8,832,644 | B2* | 9/2014 | Hirsch et al. | 717/107 |
| 2003/0140065 | A1* | 7/2003 | Lovvik et al. | 707/200 |
| 2004/0034853 | A1* | 2/2004 | Gibbons | G06F 8/61 717/174 |
| 2010/0185690 | A1* | 7/2010 | Evans et al. | 707/803 |
| 2011/0055860 | A1* | 3/2011 | Ramaswamy et al. | 725/14 |

* cited by examiner

*Primary Examiner* — Scott A Waldron
*Assistant Examiner* — Soheila Davanlou
(74) *Attorney, Agent, or Firm* — Patent Law Works LLP

(57) ABSTRACT

Custom data is injected into a comment field in an APK file. This creates a data driven, customized app, without unzipping, resigning or re-zipping the APK file. The APK file and the injected custom data are transmitted to a mobile computing device. The custom data can be injected into a comment field at the end of the APK file, which allows the non-customized version of the APK file and the custom data to be transmitted to the mobile computing device in succession, such that the transmission is received as a single, customized APK file. The content of the non-customized APK file and the custom data can instead be written to a new, customized APK file, which is then transmitted to the mobile computing device.

20 Claims, 4 Drawing Sheets

INJECTING CUSTOM DATA INTO FILES IN ZIP FORMAT CONTAINING APPS, WITHOUT UNZIPPING, RESIGNING OR RE-ZIPPING THE FILES

TECHNICAL FIELD

This disclosure pertains generally to apps for mobile computing devices, and more specifically to injecting custom data into files in zip format containing apps, without unzipping, resigning or re-zipping the files.

BACKGROUND

Mobile computing devices such as smartphones and tablet computers are becoming more widely used every day. Android is an open-source, Linux based operating system for such mobile devices that is gaining an increasingly prevalent market share. A large community of developers write applications ("apps") that run on Android devices. Many of these apps are available either for purchase or for free through the online Android Market, which is run by Google. Android apps can also be downloaded from other online stores and additional third-party sites.

An Android app is distributed in the form of an APK (Android Application Package) file. An APK file is formatted in the ZIP file format. ZIP is a file format used for data compression, archiving and distribution. Multiple folders and files can be "zipped" into and thus stored in a single ZIP file. The ZIP file can be used to distribute the stored content to target computers, on which it can be "unzipped" to recreate the zipped folder structure and install the zipped files. In the case of an APK file, all of the components and support files for an app are zipped into the APK file, which is downloaded to a target device as part of the installation process. The APK file is then unzipped on the target device, thereby installing the app. Although standard ZIP files end with the extension ".zip", APK files end with the extension ".apk".

For published software products, including Android apps, it is desirable to be able to create and distribute customized versions of the product for different enterprises, organizations or other customers. To streamline product distribution and licensing, it is important to have a data driven solution where a generic product can be customized after it was built, without having to rebuild the product. In other words, it is desirable to be able to customize a generic version of a product by including custom data with the distribution, rather than rebuilding and separately distributing the product for each target that is provided with a customized version. However, conventionally, injecting custom data in a generic APK file requires resigning the app binary, as well as unzipping and re-zipping the APK file. This approach is burdensome at best, and can be outright unfeasible, as it places a high computational demand on the server from which the APK file is being downloaded. More specifically, in order to conventionally inject custom data into an APK file, instead of simply transmitting the APK file to the target, the server must unzip the APK file, inject the custom data, resign the app, re-zip the modified, resigned content, and then transmit the updated APK file to the target. This requires significant additional CPU cycles as well as disk I/O on the server. Even if these computational resources are available, at best this process adds a great deal of overhead and slows down the distribution process.

It would be desirable to address these issues.

SUMMARY

An app customization system facilitates the distribution of files in zip format containing data driven, customized versions of apps for mobile environments. In one embodiment, the files in zip format are APK files containing Android apps. A non-customized version of a specific file in zip format (e.g., a specific APK file) containing a specific app is identified on a computer from which the specific app is downloaded to mobile computing devices. Custom data is injected into a comment field in the non-customized APK file, without unzipping, resigning or re-zipping the APK file. The injection of the custom data into the comment field customizes the app for a specific target. In one embodiment, a comment length field is updated to account for the custom data injected into the comment field. In another embodiment, the comment length field is ignored. The APK file and the injected custom data are transmitted from the computer to a mobile computing device, thereby providing the mobile computing device with a data driven, customized version of the app.

In one embodiment, the custom data is injected into the comment field of the end of central directory record, which is located at the end of the APK file. In this embodiment, the non-customized version of the APK file and the custom data can be transmitted to the mobile computing device in succession, such that the mobile computing device receives the transmission as a single, revised APK file containing the custom data in the comment field. In another embodiment, the content of the non-customized APK file and the custom data are written to a new APK file on the storage media of the computer from which the app is downloaded, thereby creating a customized APK file. That customized APK file is then transmitted to the mobile computing device. In one embodiment, the custom data is injected into a comment field in the APK file other than the one at the end, for example a comment field of a local file header. In this embodiment, values of offsets in the APK file are updated to account for the size of the injected custom data.

Once the customized APK file is transmitted to the mobile computing device, the data driven, customized version of the app runs on the mobile computing device and accesses the custom data from the APK file.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
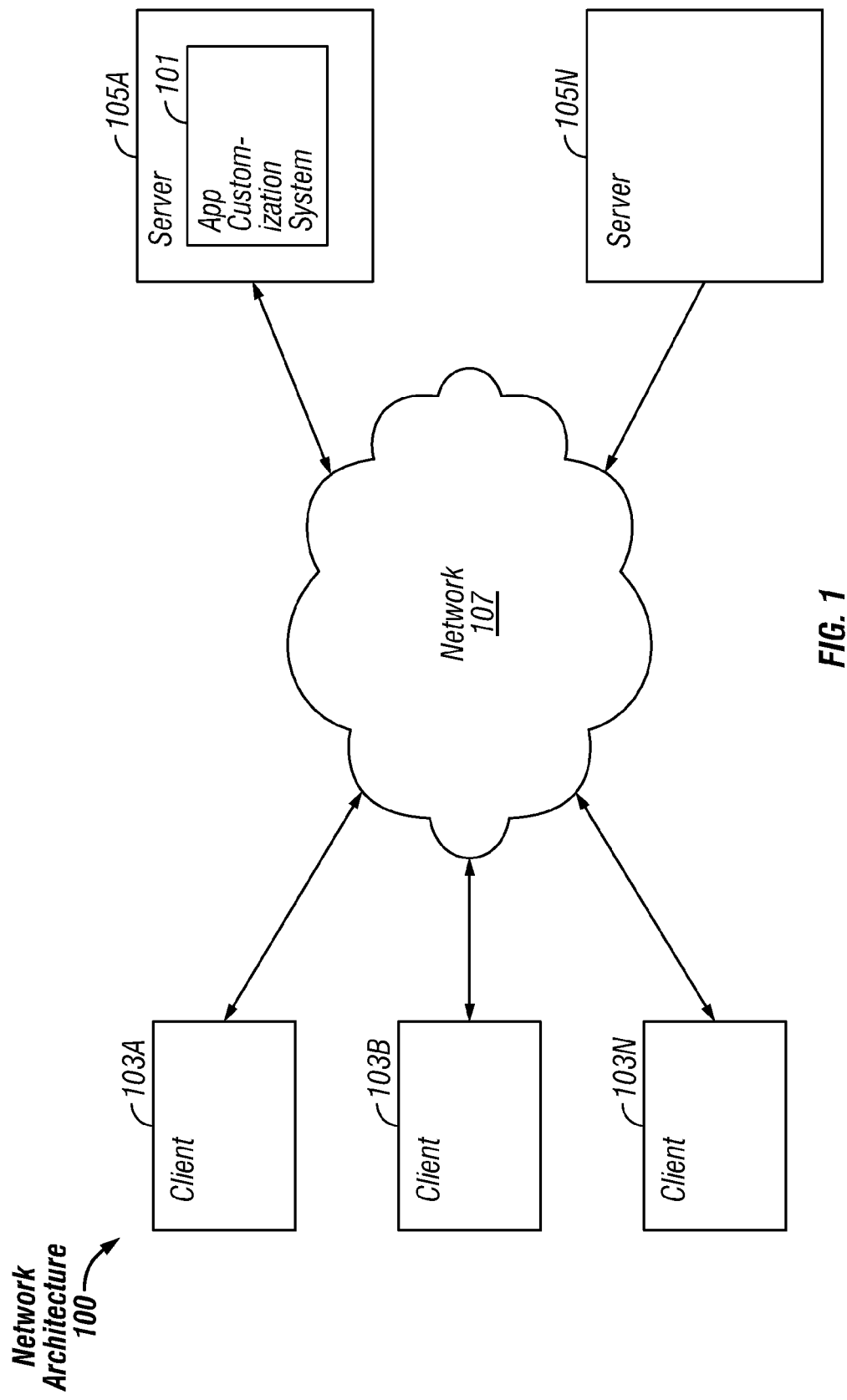
FIG. 1 is a block diagram of an exemplary network architecture in which an app customization system can be implemented, according to some embodiments.

FIG. 1 is a block diagram illustrating an exemplary network architecture 100 in which an app customization system 101 can be implemented. The illustrated network architecture 100 comprises multiple clients 103A, 103B and 103N, as well as multiple servers 105A and 105N. In FIG. 1, the app customization system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of mobile computing devices 311, comprising portable computer systems 210 capable of connecting to a network 107 and running applications. Such mobile computing devices 311 are sometimes referred to as smartphones, although many mobile phones not so designated also have these capabilities. Tablet computers are another example of mobile computing devices 311.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
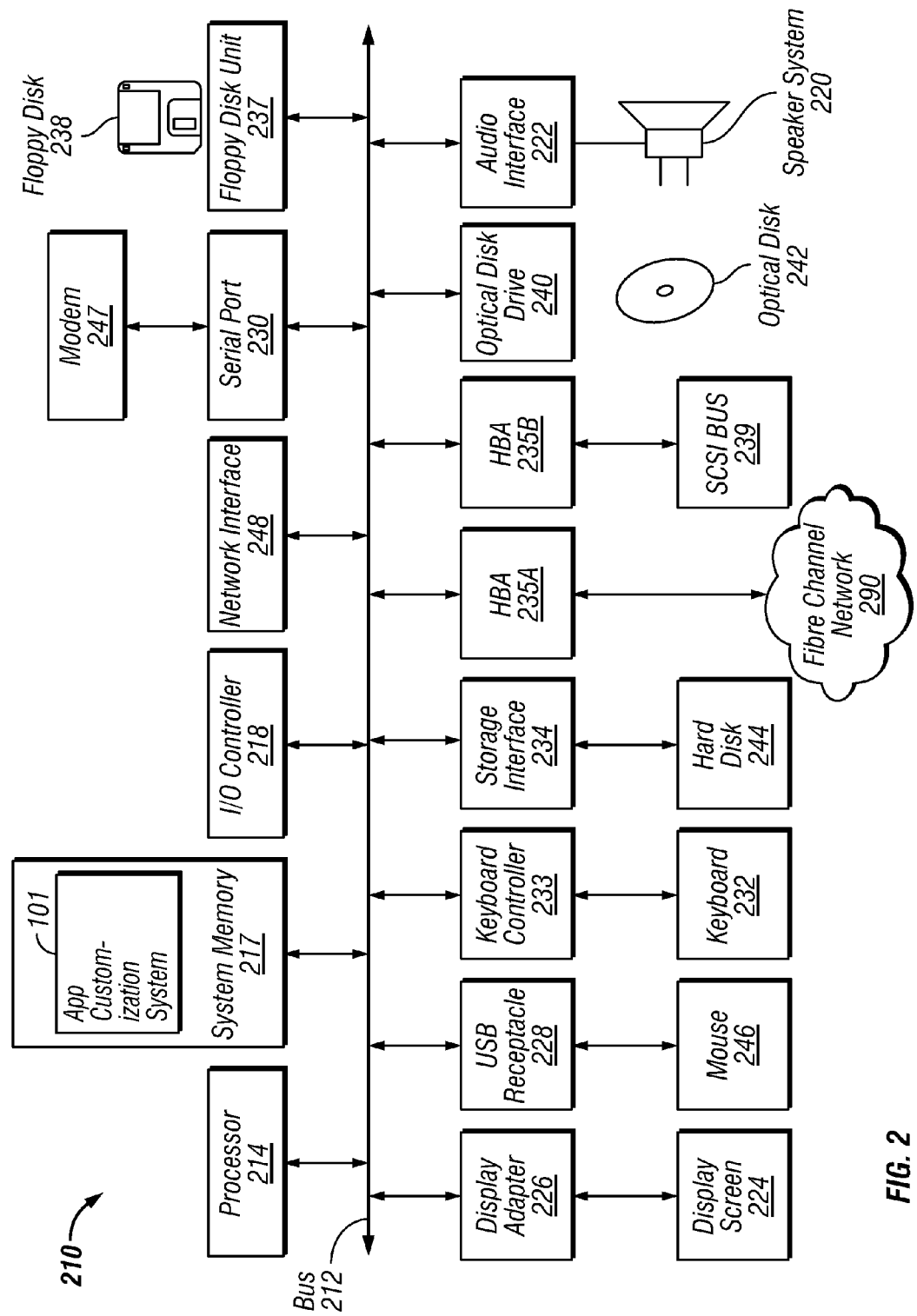
FIG. 2 is a block diagram of a computer system suitable for implementing an app customization system, according to some embodiments.

FIG. 2 is a block diagram of a computer system 210 suitable for implementing an app customization system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the app customization system 101 is illustrated as residing in system memory 217. The workings of the app customization system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
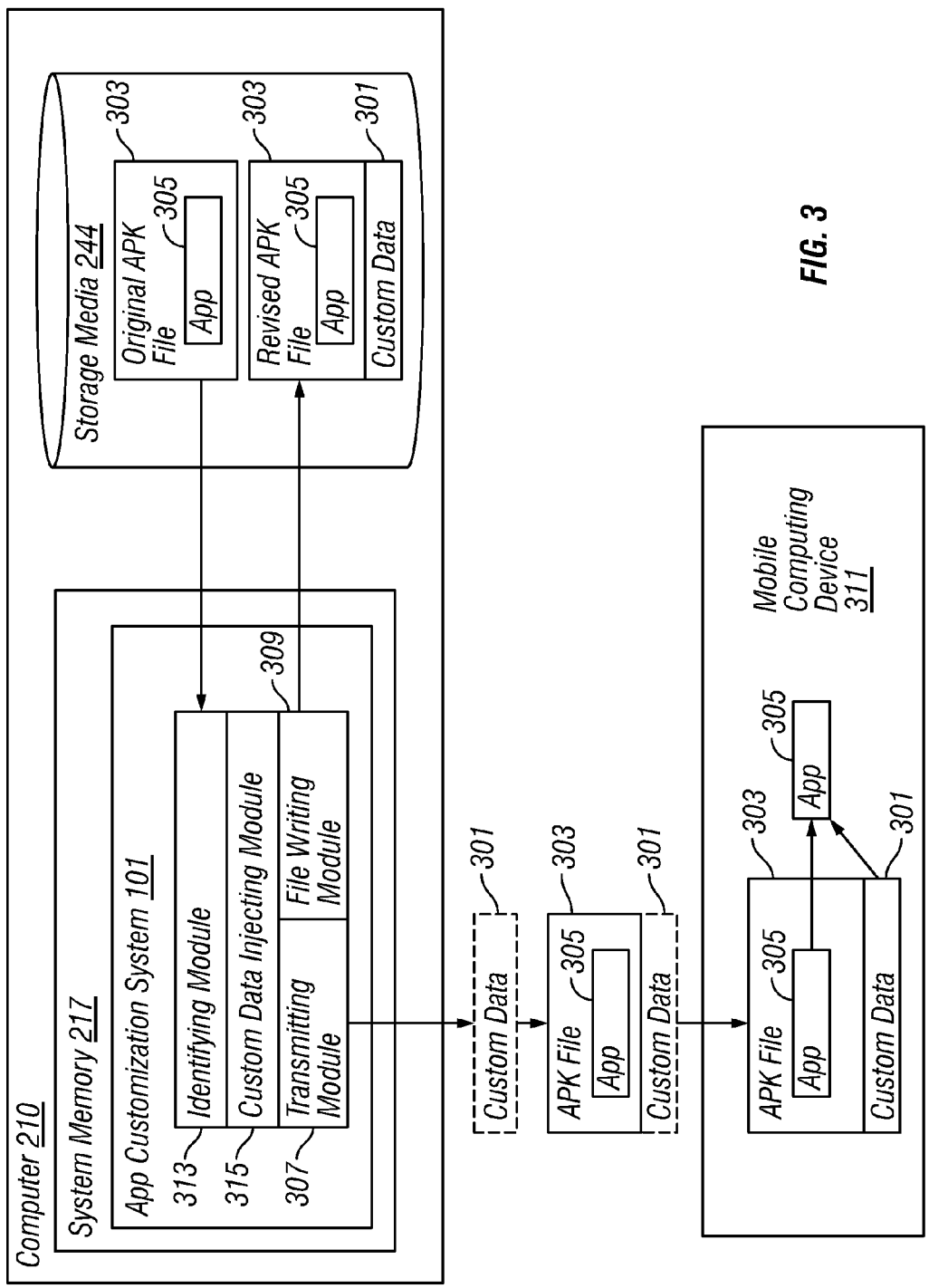
FIG. 3 is a block diagram of the operation of an app customization system, according to some embodiments.

FIG. 3 illustrates the operation of an app customization system 101, according to some embodiments. As described above, the functionalities of the app customization system 101 can reside on a client 103, a server 105, or be distributed between multiple computer systems 210, including within a cloud-based computing environment in which the functionality of the app customization system 101 is provided as a service over a network 107. It is to be understood that although the app customization system 101 is illustrated in FIG. 3 as a single entity, the illustrated app customization system 101 represents a collection of functionalities, which can be instantiated as a single or multiple modules as desired (an instantiation of specific, multiple modules of the app customization system 101 is illustrated in FIG. 3). It is to be understood that the modules of the app customization system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the app customization system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an app customization system 101 runs in the system memory 217 of a computer 210, and enables the injection of custom data 301 into an APK file 303 without requiring that the APK file 303 be unzipped, resigned or re-zipped. To do so, the app customization system 101 executes on a computer 210 from which APK files 303 are downloaded by, for example, users running mobile computing devices 311. Only one mobile computing device 311 to which an APK file 303 is being downloaded is depicted in FIG. 3 for clarity of illustration. It is to be understood that in practice many mobile computing devices 311 (and/or other types of computers 210) can download APK files 303 from the computer 210 on which the app customization system 101 is running.

When a specific user downloads a given APK file 303 in order to install the app 305 contained within, the app customization system 101 can leverage the ZIP file format, which as noted above is the format of an APK file 303, in order to inject custom data 301 into the APK file 303, thereby providing the specific user with a data driven, customized version of the app 301. For example, suppose a given app 305 is configured to require that an activation key be transmitted to the publisher when the app 305 is executed for the first time, to ensure that the user is running a licensed copy of the app 305 as opposed to a pirated copy. When a legitimate user purchases the app 305, it could be desirable for the publisher to customize the APK file 303 at the time of download to include the user's activation key. That way, when the app 305 is run it can automatically transmit the key without needing to prompt the user to enter the key manually. Other examples of customized data 301 which it could be desirable to inject into an APK file 303 at download time in order to customize the app 305 for specific users include user identifiers, login credentials, user email addresses, etc.

In order to customize a specific app 305 contained in an APK file 303 for a specific user, an identifying module 313 of the app customization system 101 identifies the original (non-customized) version of the APK file 303 containing the specific app 305, on the storage media 244 of the computer 210 from which the APK file 303 is being distributed. As stated above, in order to inject the custom data 301 without unzipping, resigning or re-zipping the APK file 303, the app customization system 101 utilizes the specific format of a ZIP file. More specifically, a file in the ZIP format, including an APK file 303, contains the following fields:

[local file header 1]
[file data 1]
[data descriptor 1]
[local file header 2]
[file data 2]
[data descriptor 2]
.
.
.
[local file header n]
[file data n]
[data descriptor n]
[archive decryption header]
[archive extra data record]
[central directory]
[zip64 end of central directory record]
[zip64 end of central directory locator]
[end of central directory record]

The "end of central directory record" section is the last section of a file in the ZIP format. The format of an end of central directory record (EOCDR) is as follows:

end of central directory record:
end of central dir signature 4 bytes (0x06054b50)
number of this disk 2 bytes
number of the disk with the start of the central directory 2 bytes
total number of entries in the central directory on this disk 2 bytes
total number of entries in the central directory 2 bytes
size of the central directory 4 bytes
offset of start of central directory with respect to the starting disk number 4 bytes
.ZIP file comment length 2 bytes
.ZIP file comment (variable size)

The field ".ZIP file comment" is the last field of the EOCDR section, and thus the last field of the entire file. Given this, a custom data injecting module 315 of the app customization system 101 can append custom data 301 of any length to the end of the APK file 303, essentially making the custom data 301 the .ZIP file comment. Note that the APK file 303 being customized was created by the publisher of the app 305 that is being distributed. Thus, the publisher of the app 305 can provide an APK file 303 with the value of the .ZIP file comment length field set to 0, and without any data in the .ZIP file comment field. In other words, the signed, zipped version of the APK file 303 does not contain a .ZIP file comment prior to the injection of the custom data 301. The custom data injecting module 315 can then inject custom data 301 into the .ZIP file comment field at download time, thereby adding custom data 301 to the APK file 303 without resigning or re-zipping it.

In one embodiment, the custom data injecting module 315 updates the .ZIP file comment length field to reflect the size, in bytes, of the custom data 301. In another embodiment, the app customization system 101 leaves the value of the .ZIP file comment length field as 0. Leaving the .ZIP file comment length field as 0 still works, even after writing data to the comment field, because the ZIP format does not include a field storing the file size. In other words, files in the ZIP format can be of variable length. Additionally, no integrity checking is performed at an Android level to ensure that the .ZIP file comment is of the length indicated by the comment length field.

In one embodiment, in order to append the custom data 301 to the end of the APK file 303 being downloaded by the user, a transmitting module 307 of the app customization system 101 first transmits the original APK file 303 to the user's mobile computing device 311, and then transmits the custom data 301, without actually writing the custom data 301 to the end of the APK file 303 on the storage media 244 of the computer 210 from which the APK file 303 is being distributed. This embodiment does not require any additional disk i/o on the server 105, as no additional content is written to disk 244 thereon. In this embodiment, the transmitting module 307 can indicate to the mobile computing device 311 that the size of the transmission of the APK file 303 is to be the size of the original APK file 303 plus the size of the custom data 301. Thus, the mobile computing device 311 expects to receive the correct total number of bytes, and writes the received custom data 301 to the end of the received APK file 303 on its local storage media 244, resulting in a customized APK file 303. The size of the transmission can be provided to the target mobile computing device 311 as part of the transmission protocol being used, for example in a communication packet header.

In another embodiment, a file writing module 309 of the app customization system 101 actually writes a revised APK file 303 on the storage media 244 of the computer 210 from which the APK file 303 is being distributed, by first writing the contents of the original APK file 303 and then writing the custom data 301. This has the effect of creating a revised APK file 303 in which the custom data is appended to the end, in the position of the .ZIP file comment field. The revised APK file 303 is then downloaded by the mobile computing device 311. This embodiment adds some disk i/o on the computer 210 from which the APK file 303 is being downloaded, but still enables custom data 301 to be injected into the APK file 303 without the need to resign or re-zip.

Thus, the custom data 301 can be injected into the APK file 303 by transmitting the original APK file 303 and the custom data 301 in succession, or by writing a revised APK file 303 consisting of the original APK file 303 with the custom data 301 appended at the end on the computer 210 from which the app 305 is distributed. Either way, it is not necessary to unzip, resign or re-zip the APK file 303. From the above description, it is to be understood that the APK file 303 need not be unzipped and re-zipped because the custom data 301 is positioned at the end of the APK file 303, which is, according to the ZIP file format, occupied by a variable length comment field. Thus, appending the custom data 301 to the original APK file 303 in the position of the comment field results in a revised APK file 303 which is still properly formatted. Rather than unzipping the APK file 303 and then re-zipping it with the addition of the custom data 301, the custom data 301 is written to the position of the comment field, without unzipping or re-zipping the content of the original APK file 303.

A further discussion of the format and processing of ZIP files explains why the revised APK file 303 does not need to be resigned. When a ZIP file is signed, rather than creating a signature based on the content of the ZIP file as a whole, a hash of each individual file being zipped is created, and stored in a special file called the manifest file. The manifest file is itself signed, and zipped with the other files. When the ZIP file is unzipped, the signature of the unzipped manifest file is checked, and hashes of the other unzipped files are checked against the signatures (hashes) stored in the unzipped manifest file. If the signature of the manifest file does not match, or any of the unzipped files are not accounted for by the manifest file or have non-matching hashes, the zip file is adjudicated as having an invalid signature. Under Android, this form of integrity checking is performed on APK files 303, and if the signature of the APK file 303 is not valid, the app 305 will not run.

Therefore, when custom data 301 is injected into an APK file 303 according to conventional methodology, by unzipping the APK file and re-zipping the custom data 301 with the content of the original APK file 303, it is necessary to resign the APK file. This involves creating a manifest file that contains a hash of the custom data 301 as well as hashes of the other files of the original APK file 303, signing that manifest file, and zipping the custom data 301, the manifest file and the files of the original APK file 303 into a revised APK file 303.

By contrast, with the use the app customization system 101 described above, because the custom data 301 is injected into the revised APK file 303 by inserting it into the comment field of an existing APK file rather than zipping it with the other files, it is not necessary to resign the APK file. The zipped files are unchanged, the manifest file is unchanged, and when the APK file 303 is unzipped, all of the signatures still match. The ZIP file format does not support signing the ZIP file as a whole based on its content including the comment field. Thus, the custom data 301 can be inserted into the comment field without having to resign the APK file 303.

In order to process a ZIP file (such as an APK file 303), the file is parsed from the end of the file towards the beginning. As noted above, the ZIP file contains a field called "end of central dir signature" which comprises four bytes with the hexadecimal value of 0x0x06054b50. Note that the end of central dir signature is not a cryptographic signature based on the content of the file, but is instead a static signature that identifies the start of the EOCDR in the ZIP file. When a ZIP file is parsed from the end of the file towards the front, when the static value of the end of central dir signature is read, the parser knows it has located the beginning of the EOCDR. The EOCDR comprises an index of the folders and files archived in the ZIP file, and includes offsets from the EOCDR to the other sections of the ZIP file.

The ZIP file format specifies the existence of comment fields in the file other than the .ZIP file comment field at the end of the central directory record. In other words, fields in other sections of the file allow for comments. For example, there is a local file header corresponding to each stored file entry, which contains a comment field. In some embodiments, the custom data injecting module 315 injects the custom data 301 into a comment field within the APK file 303 other than the .ZIP file comment field at the end of the central directory record, such as a comment field of a given local file header. These embodiments are workable because, as described above, no integrity checking is performed on the size of an APK file 303 as a whole, and the signature based integrity checking is at the level of the content of the data files and manifest file, not the content of the comment fields. This is true for the comment fields in the local file headers, as well as the comment field at the end of the EOCDR. However, because the later is at the very end of the APK file 303, after the point from which the offsets to the stored files are present, injecting the custom data 301 into the EOCDR comment field does not require updating any of the offsets to file data.

On the other hand, in an embodiment in which custom data 301 is injected into one of the other comment fields which is not located at the end of the APK file 303, offsets that occur at a point in the APK file 303 after the injected custom data 301 must be updated to account for the size of the custom data 301. Recall that an APK file 303 is parsed from the end of the file, and the offsets to file data are contained in the EOCDR and use the EOCDR as a point of reference. Thus, if custom data 301 is written to a location in the APK file 303 between an offset in the EOCDR and file data that is a target of the offset, the result is that the offset is no longer accurate. This is so because the write operation changes the distance between the offset and its target. Therefore, in this embodiment, the values of the offsets are updated to reflect the length of the injected custom data 301. Although this is feasible, and is performed by the app customization system 101 in this embodiment, it necessitates the extra above-described step of updating the offsets, and thus is less computationally efficient than the embodiment in which the custom data 301 is injected into the comment field at the end of the APK file 303.

The above description of the operation of the app customization system 101 includes specific information concerning the format of ZIP files generally and APK files 303 in particular. It is to be understood that the above-described functionality can be instantiated within the contexts of variations made to the ZIP file format, provided that the varied format in question contains at least one comment field the content of which is not included in any signature used for checking the integrity of the contents of the file.

It is to be understood that the official Android Market does not support distribution of multiple layouts for a single app 305 or the customization of an APK file 303 for an individual user. Therefore, unless these restrictions are lifted, the above-described operation of the app customization system 101 cannot be executed from the Official Android Market. However, Android allows apps 305 to be distributed from other online stores and websites, which is known as side-loading. The above-described functionality can be executed from any site that supports distribution of customized versions of an app 305 for different users. Such a site can be in the form of a secondary market or eStore, as well as a website provided or controlled by the publisher of the app 305 in question.

It is to be understood that when an app 305 runs (e.g., on the mobile computing device 311 to which it has been downloaded), the app 305 has access to its own APK file 303 (i.e., the APK file 303 in which the app 305 was distributed). Thus, when the app 305 runs, it can access and read its APK file 303, and thus read the custom data 301 from the specific comment field in the APK file 303 where it is located. Thus, once an APK file 303 containing custom data 301 has been downloaded, the app 305 runs and accesses the custom data 301.

Although use of the app customization system 101 is described above within the context of Android apps 305, in other embodiments the above-described functionality could be applied in the context of another form of application distributed in a file in the ZIP format, or even within the context of a ZIP file used to distribute data without code.

The above-described operation of the app customization system 101 enables the injection of custom data 301 into an APK file 303 without requiring that the APK file 303 be resigned. The data injection can be pipelined while the rest of APK file 303 is being downloaded. This solution is very efficient in terms of resource usage on the server 105 from which the app 305 is being distributed. Thus, the use of this functionality can provide more efficient product distribution and licensing for Android apps 305.

Figure 4:
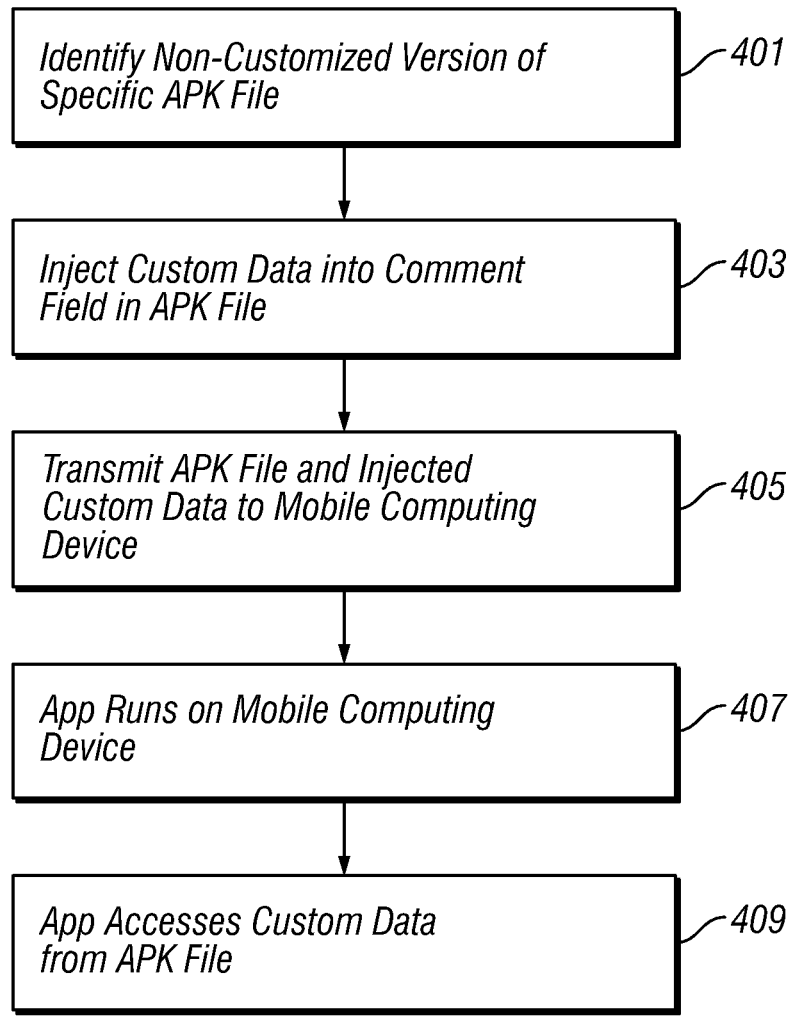
FIG. 4 is a flowchart of the operation of an app customization system, according to some embodiments.

FIG. 4 is a flowchart of the operation of the app customization system 101, according to some embodiments. The identifying module 313 identifies 401 a non-customized version of a specific APK file 303 containing a specific app 305, on the storage media 244 of the computer 210 from which the app 305 is downloaded to mobile computing devices 311. The custom data injecting module 315 injects 403 custom data 301 into a comment field in the specific APK file 303 containing the specific app 305, without unzipping, resigning or re-zipping the APK file 303, thereby customizing the app 305 for a specific target. The transmitting module 307 transmits 405 the APK file 303 and the injected custom data 301 to a mobile computing device 311, thereby providing the mobile computing device 311 with a data driven, customized version of the app 305. The data driven, customized version of the app 305 runs 407 on the mobile computing device 311, and accesses 409 the custom data 301 from the APK file 303.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for customizing apps for specific mobile environments, the method comprising the steps of:
   receiving a download request for an app from a specific target associated with a mobile computing device, along with custom data associated with the specific target, wherein different specific targets are associated with distinct custom data;
   identifying, by a computer from which the app is downloaded to mobile computing devices, a non-customized version of a specific file in zip format containing a specific app;
   responsive to the custom data of the download request, injecting custom data that customizes the app for the specific target into a comment field in the specific file in zip format containing the specific app, without unzipping, resigning or re-zipping the specific file in zip format, wherein the injected custom data customizes the app for a specific target, wherein the comment field is located at the end of a section of a frame to allow for a variably large amount of data for the comment field within the frame, and wherein the custom data being unzipped is packaged with the non-customized version of the specific file in zip format; and
   transmitting the file in zip format and the injected custom data from the computer from which the app is downloaded to the mobile computing device, thereby providing the mobile computing device with a data driven, version of the app that is customized for the specific target, wherein the specific target downloads and runs the app, and reads the custom data from the comment field to customize the app according to the specific target running the app.

2. The method of claim 1 wherein injecting custom data into a comment field in the specific file in zip format containing the specific app further comprises:
   injecting custom data into a comment field located at the end of the file in zip format.

3. The method of claim 1 wherein injecting custom data into a comment field in the specific file in zip format containing the specific app further comprises:
   injecting custom data into a comment field of an end of a central directory record field of the file in zip format.

4. The method of claim 1 wherein injecting custom data into a comment field in the specific file in zip format containing the specific app further comprises:
   injecting custom data into a comment field of a local file header of the file in zip format; and
   updating values of offsets in the file in zip format to account for the injected custom data into the comment field.

5. The method of claim 1 further comprising:
   updating a comment length field in the file in zip format to account for the custom data injected into the comment field.

6. The method of claim 1 wherein:
   the specific file in zip format comprises a specific APK (Android Application Package) file; and
   the specific app contained in the specific file in zip format comprises a specific Android app.

7. The method of claim 1 wherein injecting custom data into a comment field in the specific file in zip format containing the specific app further comprises:
   transmitting the non-customized version of the specific file in zip format containing the specific app and the custom data in succession to a mobile computing device, such that the mobile computing device receives the non-customized version of the specific file in zip format containing the specific app and the custom data as a single, customized file in zip format.

8. The method of claim 1 wherein injecting custom data into a comment field in the specific file in zip format containing the specific app further comprises:
   writing the contents of the non-customized version of the specific file in zip format to a new file in zip format, on the computer from which the app is downloaded to mobile computing devices; and
   writing the custom data to a comment field in the new file in zip format, on the computer from which the app is downloaded to mobile computing devices, thereby creating a customized file in zip format.

9. The method of claim 1 wherein transmitting the file in zip format and the injected custom data from the computer to the mobile computing device further comprises:
   transmitting the file in zip format and the injected custom data to the mobile computing device such that the data driven, customized version of the app runs on the mobile computing device and accesses the custom data from the file in zip format.

10. At least one non-transitory computer readable medium for customizing apps for specific mobile environments, the at least one non-transitory computer readable medium storing program code that, when loaded into computer memory and executed by a processor performs the following steps:
    receiving a download request for an app from a specific target associated with a mobile computing device, along with custom data associated with the specific target, wherein different specific targets are associated with distinct custom data;
    identifying, by a computer from which an app is downloaded to mobile computing devices, a non-customized version of a specific file in zip format containing a specific app;
    responsive to the custom data of the download request, injecting custom data that customizes the app for the specific target into a comment field in the specific file in zip format containing the specific app, without unzipping, resigning or re-zipping the specific file in zip format, wherein the injected custom data customizes the app for a specific target, wherein the comment field is located at the end of a section of a frame to allow for a variably large amount of data for the comment field within the frame, and wherein the custom data being unzipped is packaged with the non-customized version of the specific file in zip format; and
    transmitting the file in zip format and the injected custom data from the computer from which the app is downloaded to a mobile computing device, thereby providing the mobile computing device with a data driven, customized version of the app, wherein the specific target downloads and runs the app, and reads the custom data from the comment field to customize the app according to the specific target running the app.

11. The at least one non-transitory computer readable medium of claim 10 wherein injecting custom data into a comment field in the specific file in zip format containing the specific app further comprises:
    injecting custom data into a comment field located at the end of the file in zip format.

12. The at least one non-transitory computer readable medium of claim 10 wherein injecting custom data into a comment field in the specific file in zip format containing the specific app further comprises:
    injecting custom data into a comment field of an end of a central directory record field of the file in zip format.

13. The at least one non-transitory computer readable medium of claim 10 wherein injecting custom data into a comment field in the specific file in zip format containing the specific app further comprises:
    injecting custom data into a comment field of a local file header of the file in zip format; and
    updating values of offsets in the file in zip format to account for the injected custom data into the comment field.

14. The at least one non-transitory computer readable medium of claim 10 further storing program code that when loaded into computer memory and executed by the processor performs the following additional step:
    updating a comment length field in the file in zip format to account for the custom data injected into the comment field.

15. The at least one non-transitory computer readable medium of claim 10 wherein:
    the specific file in zip format comprises a specific APK (Android Application Package) file; and
    the specific app contained in the specific file in zip format comprises a specific Android app.

16. The at least one non-transitory computer readable medium of claim 10 wherein injecting custom data into a comment field in the specific file in zip format containing the specific app further comprises:
    transmitting the non-customized version of the specific file in zip format containing the specific app and the custom data in succession to a mobile computing device, such that the mobile computing device receives the non-customized version of the specific file in zip format containing the specific app and the custom data as a single, customized file in zip format.

17. The at least one non-transitory computer readable medium of claim 10 wherein injecting custom data into a comment field in the specific file in zip format containing the specific app further comprises:
    writing the contents of the non-customized version of the specific file in zip format to a new file in zip format, on the computer from which the app is downloaded to mobile computing devices; and
    writing the custom data to a comment field in the new file in zip format, on the computer from which the app is downloaded to mobile computing devices, thereby creating a customized file in zip format.

18. The at least one non-transitory computer readable medium of claim 10 wherein transmitting the file in zip format and the injected custom data from the computer to the mobile computing device further comprises:
    transmitting the file in zip format and the injected custom data to the mobile computing device such that the data driven, customized version of the app runs on the mobile computing device and accesses the custom data from the file in zip format.

19. A computer system for customizing apps for specific mobile environments computer memory;
    at least one processor;
    a storage medium;
    a receiving module residing in the computer memory, configured to receive a download request for an app from a specific target associated with a mobile computing device, along with custom data associated with the specific target, wherein different specific targets are associated with distinct custom data;

an identifying module residing in the computer memory, configured to identify a non-customized version of a specific file in zip format containing a specific app located on the storage medium;

a custom data injecting module residing in the computer memory, configured to, responsive to the custom data of the download request, inject custom data that customizes the app for the specific target into a comment field in the specific file in zip format containing the specific app, without unzipping, resigning or re-zipping the specific file in zip format, wherein the injected custom data customizes the app for a specific target, wherein the comment field is located at the end of a section of a frame to allow for a variably large amount of data for the comment field within the frame, and wherein the custom data being unzipped is packaged with the non-customized version of the specific file in zip format; and a transmitting module residing in the computer memory, configured to transmit the file in zip format and the injected custom data from the computer from which the app is downloaded to a mobile computing device, thereby providing the mobile computing device with a data driven, customized version of the app, wherein the specific target downloads and runs the app, and reads the custom data from the comment field to customize the app according to the specific target running the app.

20. The computer system of claim 19 wherein:

the specific file in zip format comprises a specific APK (Android Application Package) file; and the specific app contained in the specific file in zip format comprises a specific Android app.

\* \* \* \* \*